United States Patent [19]
Kushner et al.

[11] 3,937,641
[45] Feb. 10, 1976

[54] METHOD OF ASSEMBLING ADHESIVE JOINT

[75] Inventors: Gerald J. Kushner; William D. Irish, both of Louisville, Ky.

[73] Assignee: General Electric Company, Louisville, Ky.

[22] Filed: Aug. 30, 1974

[21] Appl. No.: 501,881

[52] U.S. Cl. ............... 156/87; 156/195; 156/294; 264/262; 285/422
[51] Int. Cl.² ......................................... B65H 81/00
[58] Field of Search ............ 156/293, 294, 195, 86, 156/295, 423, 303.1, 304, 87; 264/262; 285/286, 288, 292–293, 422

[56] References Cited
UNITED STATES PATENTS

| | | | |
|---|---|---|---|
| 3,278,357 | 10/1966 | Gettig et al. | 156/295 X |
| 3,282,758 | 11/1966 | D'Ascoli | 156/86 |
| 3,378,672 | 4/1968 | Blumenkranz | 264/262 X |
| 3,498,866 | 3/1970 | Kilbane | 156/294 X |
| 3,847,694 | 11/1974 | Stewing | 156/295 X |

Primary Examiner—Douglas J. Drummond
Assistant Examiner—David A. Simmons

[57] ABSTRACT

The method of joining aluminum tubing wherein a heat curable adhesive in tape form is helically wound on the end portion of one tube prior to its being telescoped with the heated end of a second tube.

4 Claims, 3 Drawing Figures

U.S. Patent   Feb. 10, 1976   3,937,641
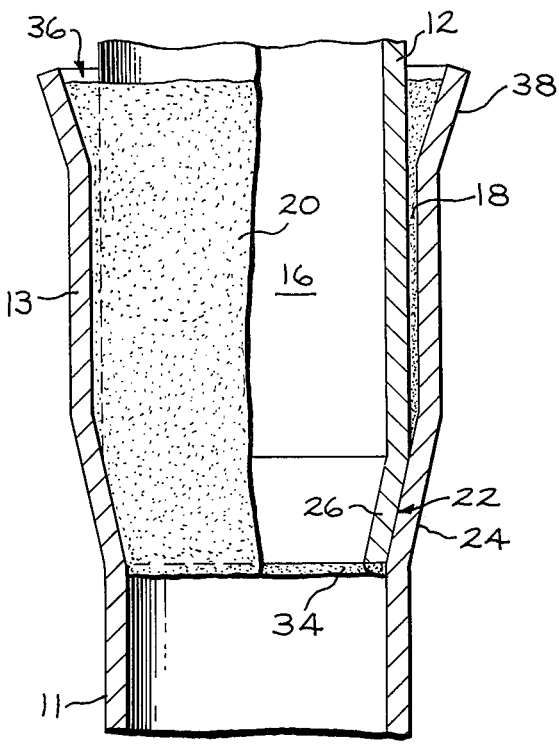
FIG. 1
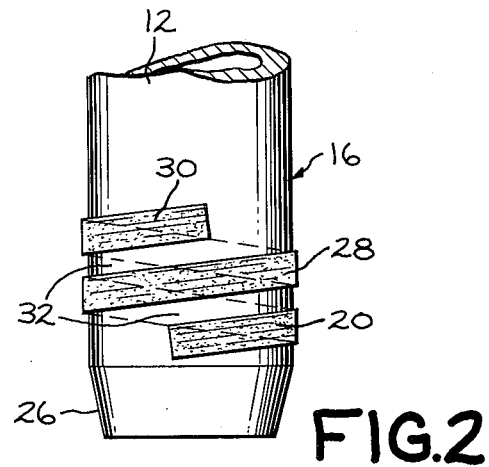
FIG. 2
FIG. 3
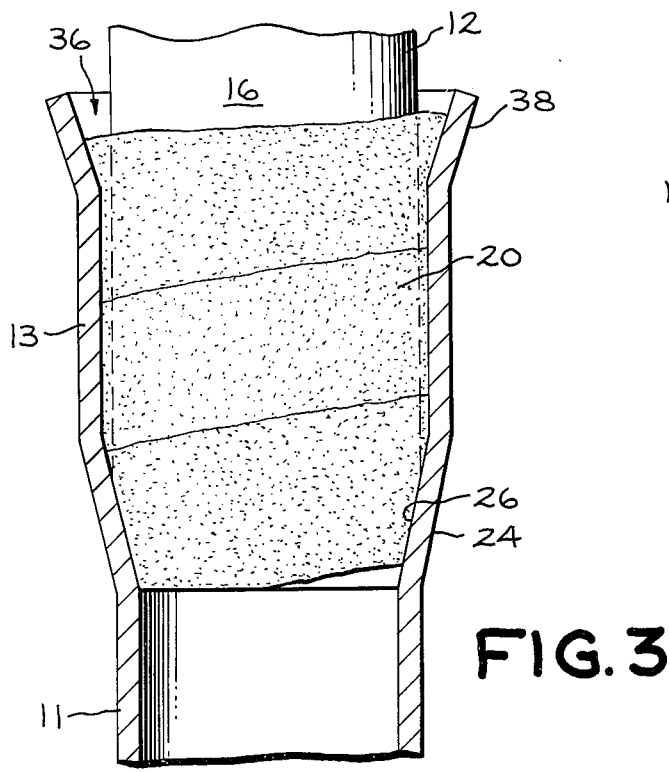

METHOD OF ASSEMBLING ADHESIVE JOINT

BACKGROUND OF THE INVENTION

1. Field of the Invention

This invention relates generally to a joint for adhesively connecting tube members, and more specifically to the method of applying an adhesive tape to the end of one tube, heating the end of the other tube, telescoping the ends of the tubes, and allowing the adhesive to spread and fill the radial clearance between the tubes, heating the telescoped joint to cure and set the adhesive.

2. Description of the Prior Art

In the fabrication of tube joints employing adhesive as a sealing medium it has been customary to shape or form one tube element relative to the other. This has been necessary to insure the integrity of the joint and to provide a leak-free joint over a wide range of tolerances. This is especially true when the tube ends to be joined are misaligned and the radial clearance between the tube is not maintained which may cause a wiping away of the adhesive and some portions of the joint. To avoid leaks in these incidents it has been customary, as for example, in U.S. Pat. Nos. 3,124,874 — Woolley and 3,068,563 — Reverman, to crimp or form beads to shape or resize the tube members after they are telescoped together. This shaping or forming process requires a substantial investment in manufacturing equipment and the additional time necessary to carry out the operation. In the fabrication of heat exchange assemblies including many passes and reverse turns, several joints may be located in close proximity to each other, thus making the shaping and forming operations impractical in that the space requirements are not available for the crimping and/or resizing operations.

SUMMARY OF THE INVENTION

According to the present invention there is provided a method of joining metallic tubing comprising a first tube having an end portion adapted to receive an end portion of a second tube with radial clearance between the contiguous surfaces of the two tubes. The steps include winding a film of adhesive tape on the end portion of the second tube, heating the end portion of the first tube to a temperature sufficient to plasticize the adhesive, inserting the end portion of the second tube into the heated end of the first tube and allowing the adhesive to spread and fill the radial clearance, placing the telescoped joint in a vertical position with the open end of the first tube in the up position to allow the adhesive to spread in a direction away from the open end while heating the joint to cure and set the adhesive.

DESCRIPTION OF THE DRAWINGS

FIG. 1 is an elevational view of the completed joint formed by the method of the present invention;

FIG. 2 is an elevational view of the end portion of the tubes to be joined; and

FIG. 3 is a view showing the tube ends telescoped.

DESCRIPTION OF THE PREFERRED EMBODIMENT

FIG. 2 illustrates end portions of two tubes 11 and 12 which are to be joined by the method of this invention. The tube 11 which is to form the outer or female tubular portion of the completed joint 10 includes an enlarged end 13.

The bore 15 (FIG. 1) of the flared end 13 of the tube 11 is sized to receive the complimentary shaped end 16 of the inner tube 12 with a slight clearance between the surfaces of the tubes which are contiguous in the completed joint. This oversizing or clearance provides a radial clearance defining retaining area 18 into which an adhesive 20 is maintained.

A coating of adhesive 20 is applied to the outer surface of end 16 of the inner tube 12 in a form and manner that, as will hereinafter be described, will resist being wiped clean from the end 16 during insertion of the inner tube 12 into the outer tube 11. A sealing area 22 is provided in the joint by a flange 24 formed in the end 13 engaging a complementary shaped flange 26 formed in the end 16 when the tubes are fully telescoped.

In accordance with carrying out the method of the present invention an adhesive that is in a solid state at ambient temperature is employed. The adhesive 20 employed is applied to the end portion 14 in a strip or tape form 28 as indicated in FIG. 2. It is apparent that by using a tape or strip 28 the film of adhesive 20 as applied to the end portion 14 may have a precise predetermined thickness relative to the diameter of end portion 16 and the bore 15. Further, the volume of the adhesive 20 may be precisely controlled relative to the volume of the retaining area 16. The application of the adhesive 20 in tape form 28 has another advantage in that it has a greater resistance to sheer force than the usual adhesive customarily used in joints that is applied in a liquid state. This is especially critical during the telescoping operation when the tubes may not be axially aligned and as a result contact may be made at a tangent point of the misaligned tubes. In that instance, a liquid adhesive which offers little or no resistance to the sheer forces in the contact area may be wiped off causing voids and ultimate leaks in completed joints.

In carrying out the present invention an epoxy adhesive is used that is in a solid state in ambient temperatures and has a scrim of unwoven dacron threads indicated at 30 in FIG. 2 disposed longitudinally when in a form as a strip or tape 28. While other adhesives in tape form may work in carrying out the method of the present invention an epoxy commercially available from 3M Company and identified by them as XC235 was used successfully.

Accordingly, a predetermined length of adhesive tape 28 is helically wound upon the end portion 16 of the tube 12. The volume of tape 28 used is carefully measured to insure that it has a greater volume than that of retaining area 18.

As will be noted in FIG. 2 the tape 28 is wound so that a space 32 is maintained between the windings and that there is no overlapping of the tape. As will be explained in detail hereinafter, the space 32 provided between the windings has a particular function in the method of producing the joint in accordance with the present embodiment.

In the next step of the method the tube 11 is heated to a temperature sufficient to plasticize the adhesive. In the present instance, with the above-mentioned adhesive, the tube 11 and more specifically the bore 15 is heated to a temperature of between 200° and 225°F. which has been found to be effective in plasticizing the adhesive tape 28 on end portion 14 when the tube 12 is inserted into the bore 15 of tube 11. During the telescoping of the tubes, the adhesive tape 28 plasticizes and spreads into the spaces 32 between the helical windings as it comes in contact with the heated surfaces of the bore 15. It should be noted that the spreading of adhesive 20 is progressive with the insertion process of one tube into the other and as a result air that may be trapped in the adhesive 20 is driven along spiral space 32 between the windings of the adhesive tape 28 and out the open end of the tube 11.

At the point of complete telescoping of the parts as shown in FIG. 3 the adhesive 20, since it has a greater volume than that of the retaining area, has spread to substantially eliminate the spaces 32 between the adhesive spirals and to fill the retaining area 18 between the tube members.

In the final step in the method of forming the joint of the present embodiment the adhesive 20 is cured at a temperature of between 325° and 370°F. for approximately 1 hour. During the initial curing procedure the adhesive 20 becomes fluid and the individual passes of adhesive tape 28 flows together into the receiving area 18 and sealing area 22 to form a complete void-free film of adhesive. To facilitate the flow of adhesive into the joint area during the curing step it may, depending on the adhesive used, be necessary to elevate the open end of tube 11 relative to the retaining area 18. To insure that the adhesive used in the present embodiment flows into the retaining area 18 while it is in this initial liquid state it is desirable to arrange the telescoped joint in a substantially vertical position with the open end of tube 11 oriented upwardly as seen in FIG. 3. Since the space between the flanges 24 and 26 is almost zero the adhesive 20 that flows past the area 22 is a relatively small predetermined amount sufficient to form a bead or filet 34 that forms an additional seal to the joint. The area 36 provided by a flange 38 formed on the free end of tube 11 receives the predetermined excess amount of adhesive as shown in FIG. 1 where the joint formed in accordance with the method of the present invention is illustrated.

While there has been shown and described a specific embodiment of the invention, it will be understood that it is not limited thereto and it is intended by the appended claims to cover all such modifications as fall within the true spirit and scope of the invention.

What is claimed is:

1. A method of joining metallic tubing comprising:
   providing a first tube having an end portion adapted to receive an end portion of a second tube with radial clearance between the contiguous surfaces of the two tubes;
   helically winding a single thickness of heat curable adhesive film having a volume greater than said radial clearance to the end portion of said second tube to provide a space between said windings;
   heating the end portion of said first tube to a temperature sufficient to plasticize said adhesive film;
   telescoping the end portion of said second tube into the heated bore of the first tube and allowing the adhesive on said second tube to plasticize and spread into the radial clearance between the contiguous surfaces of the tubes while air entrapped during the spreading of said adhesive escapes between the helical winding and past the open end of said second tube; and
   heating said telescoped joint to a temperature sufficient to cure said adhesive.

2. The method as set forth in claim 1 wherein said telescoped joint is positioned so that the open end of said first tube is elevated relative to said end portions to allow said adhesive to distribute into said radial clearance in a direction away from said open end while heating said telescoped joint to a temperature sufficient to cure said adhesive.

3. The method as set forth in claim 1 wherein said telescoped joint is positioned substantially vertical, with the open end of said first tube facing in an up direction to allow said adhesive to distribute into said radial clearance in a direction away from said open end while heating said telescoped joint to a temperature sufficient to cure said adhesive.

4. The method as set forth in claim 1, wherein said adhesive thickness is greater than said radial clearance to insure contact between the surface of said heated bore and the radially disposed surface of said adhesive.

* * * * *